INVENTOR.
A. C. HOWARD
BY
*Young + Zwig*
ATTORNEYS

INVENTOR.
A.C. HOWARD

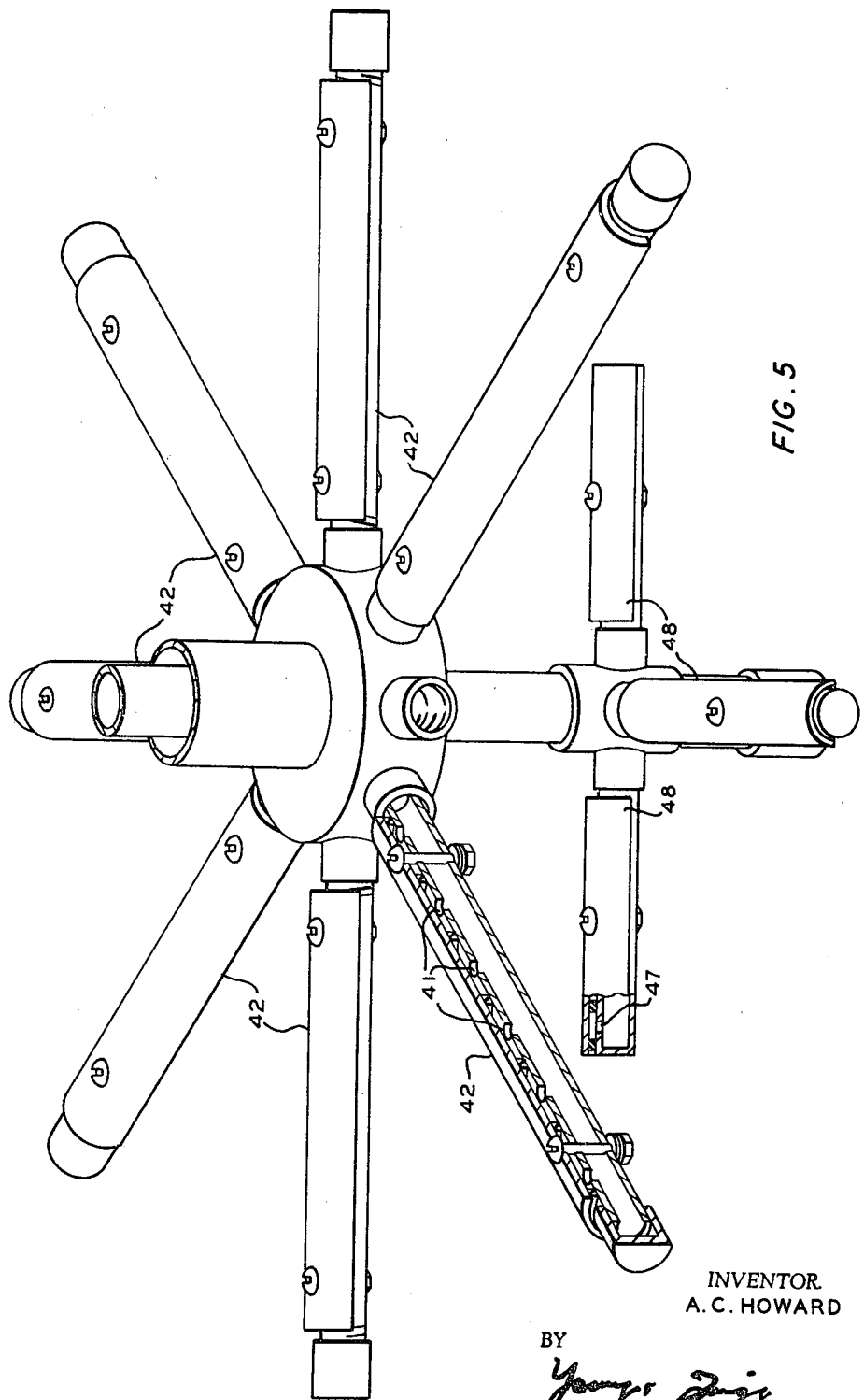

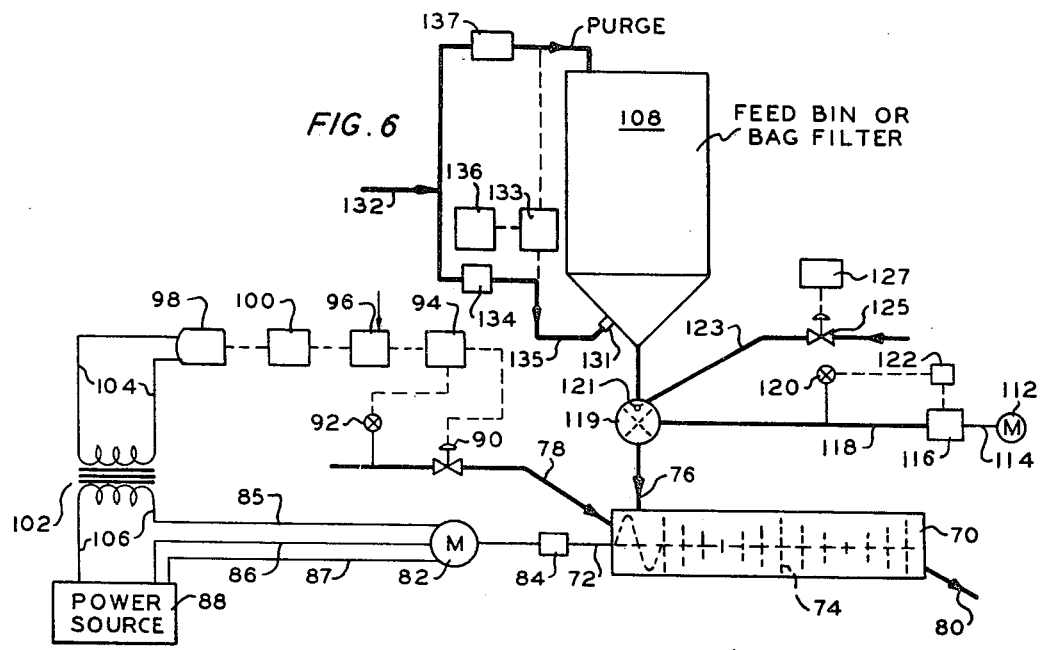
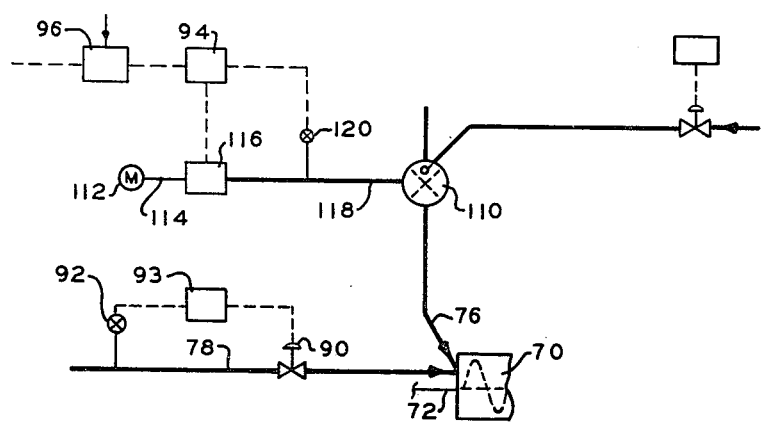
FIG. 7
INVENTOR.
A.C. HOWARD
BY
*Younger Hinggs*
ATTORNEYS

United States Patent Office 3,493,350
Patented Feb. 3, 1970

3,493,350
CARBON BLACK FEEDING TO A PELLETIZER USING GAS PULSES IN THE FLOW CONTROL ZONE
Allen C. Howard, Orange, Tex., assignor to Phillips Petroleum Company, a corporation of Delaware
Original application July 25, 1963, Ser. No. 297,604, now Patent No. 3,249,263, dated May 3, 1966. Divided and this application Feb. 16, 1966, Ser. No. 527,898
Int. Cl. C01b *31/14;* C09c *1/58*
U.S. Cl. 23—314                    3 Claims

ABSTRACT OF THE DISCLOSURE

In a carbon black wet pelleting process wherein the flow of black and aqueous liquid to a rotatable pelletizer mixer are controlled, pulses of a gas are injected at regular intervals into the carbon black flow control zone to prevent undesired variations in carbon black feed rate on stoppage of flow.

---

This application is a division of my copending application Ser. No. 297,604, filed July 25, 1963, now U.S. Patent No. 3,249,263.

This invention relates to method and apparatus for feeding particulate material. In one aspect the invention relates to method and apparatus for preventing variations in feed rate from a particulate material feeder. In another aspect the invention relates to an improved feeder for particulate material. In another aspect the invention relates to an improved rotary feeding wheel apparatus. In another aspect the invention relates to method and apparatus for feeding loose carbon black. In another aspect the invention relates to method and apparatus for controlling carbon black pelleting operations.

Control of the feed rate of a particulate material can be obtained by feeding from a bin through an outlet opening having feed control means such as a feeder wheel, for example, a star wheel or star valve type. However, such an operation is subject to feed stoppages or variations in rates due to packing or bridging of the particulate material. I have found that such feed stoppages or flow rate variations can be alleviated or completely prevented by pulsed air injections as described herein.

It is conventional to wet pellet carbon black in various types of pelleting mills or drums. One process utilizes a pelletizer-mixer substantially in the form of a pug mill. This device comprises an elongated cylindrical shell or drum having an axial shaft extending therethrough with rods extending radially from the shaft in a spiral pattern longitudinally thereof. The rods are chisel pointed and extend to within a short distance of the shell so that upon rotation of the mill the water and carbon black introduced into the mil are thoroughly mixed and agitated. This procedure forms wet pellets when the proper proportions of water and black are introduced into the mill. It is well known that to make pellets with this technique, the water must be within the range of 42 to 58 weight percent of the mixture and the quality of the pellets is better if the water content is maintained within the narrower range of about 46 to 54 weight percent. While it is relatively simple to control the rate of flow of water or aqueous liquid (for example, a molasses-water solution) to the carbon black, previously it has been impossible by any known method to maintain a constant rate of flow of flocculent loose carbon black to a process or to a pelletizer. In carbon black plants utilizing either wet pelleting or dry pelleting, it is not uncommon for the flow of black to vary as much as 900 pounds per hour in a period of five minutes, or even to stop completely. By the practice of my invention, the rate of variation of flow of carbon black to a pelletizer is reduced to the extent that the variation is substantially undetectable over short periods of time, thus greatly simplifying control of a wet pelleting process and reducing the possibility of producing carbon black pellets of unacceptable quality. The system for controlling the flow of the molasses-water or carbon black feed rate in accordance with the power demand of the motor driving the pelletizer is disclosed in copending application Ser. No. 269,248, filed Apr. 1, 1963, a continuation-in-part of Ser. No. 128,445, Alleman, filed Aug. 1, 1961, now abandoned.

An object of this invention is to feed particulate material with minimum flow stoppage and maximum flow control accuracy.

Another object of this invention is to provide feed and feed control means for particulate material.

Another object of this invention is to feed and control the feed rate of loose carbon black.

Another object of this invention is to control a carbon black wet pelleting operation.

Other aspects, objects and the advantages of this invention are apparent in the written description, the drawing and the claims.

According to my invention, bridging of loose particulate material and variation in feed rate of such material are prevented by pulsed injections of a gas, for example, air, immediately above or in the upper portion of a rotary feed apparatus such as a star valve. The particulate material is gathered in a storage zone, fed by gravity through a rotary feeding apparatus such as a star valve and the feed rate controlled by controlling the speed of rotation of the valve. By injecting a gas in regularly spaced pulses into the upper portion of the valve or into the space in the outlet conduit from the bin immediately above the valve, variation in feed rate or stoppage of flow can be prevented. It is sometimes desirable to inject the gas, for example air, at a plurality of points and to accompany it with stirring in the bin outlet. For example, a plurality of injection conduits can be spaced around the bin outlet above the rotary feeding means in place of or in conjunction with an air inlet in or immediately above the feeding means.

Also according to my invention there are provided combination stirring and fluidizing means comprising concentric feed conduits and a plurality of outlet openings at two spaced intervals within the bin outlet. Separate horizontally-extending gas inlet conduits can be used, or vertically and horizontally-extending conduits having separate upper and lower zone feed outlets. In the latter instance a generally frusto-conical bin outlet can be provided with combination stirring and fluidizing means including a plurality of injection conduits substantially parallel to the inner wall of the outlet and provided with separate upper and lower inlets and a divider in a central portion, thereby permitting separate injection to upper and lower zones within the outlet conduit. A central injection outlet extending below the lower of the two fluidizing zones is useful in many instances to provide an outlet immediately above the rotary flow control means.

Further, according to my invention there are provided a method and apparatus for controlling a carbon black wet pelleting operation by simultaneous control of the wetting solution supplied to the pelleting zones or by control of the flow of carbon black to the pelleting zone to maintain relatively constant the power supplied to a motor driving the pelleting means while at the same time preventing uncontrolled variation in the carbon black flow rate by pulsed injections of gas immediately above or in the upper portion of a rotary feed apparatus.

My invention is especially adapted to use in a system wherein loose carbon black is fed to carbon black pelleting apparatus. To provide the proper load in the pelleting apparatus and thereby maintain proper pelleting conditions, it is important to provide an accurate feed of the loose carbon black.

In the drawing, FIGURE 1 is a schematic vertical elevation of my invention applied to carbon black feeding.

FIGURE 2 is a vertical cross section of a bin outlet showing combination stirring and fluidizing means.

FIGURE 3 also shows combination fluidizing and stirring means in which continuous conduits extend from the upper to the lower zone.

FIGURE 5 is a diametric view, partly in cross section, of the apparatus of FIGURE 2.

FIGURE 6 is a schematic vertical elevation of a system according to my invention in which simultaneous control of water to the pelletizer and pulsed injection to the rotary feed apparatus are provided.

FIGURE 7 illustrates the simultaneous control of carbon black feed and the maintenance of pulsed injections of gas into the feed mechanism.

Figure 1:
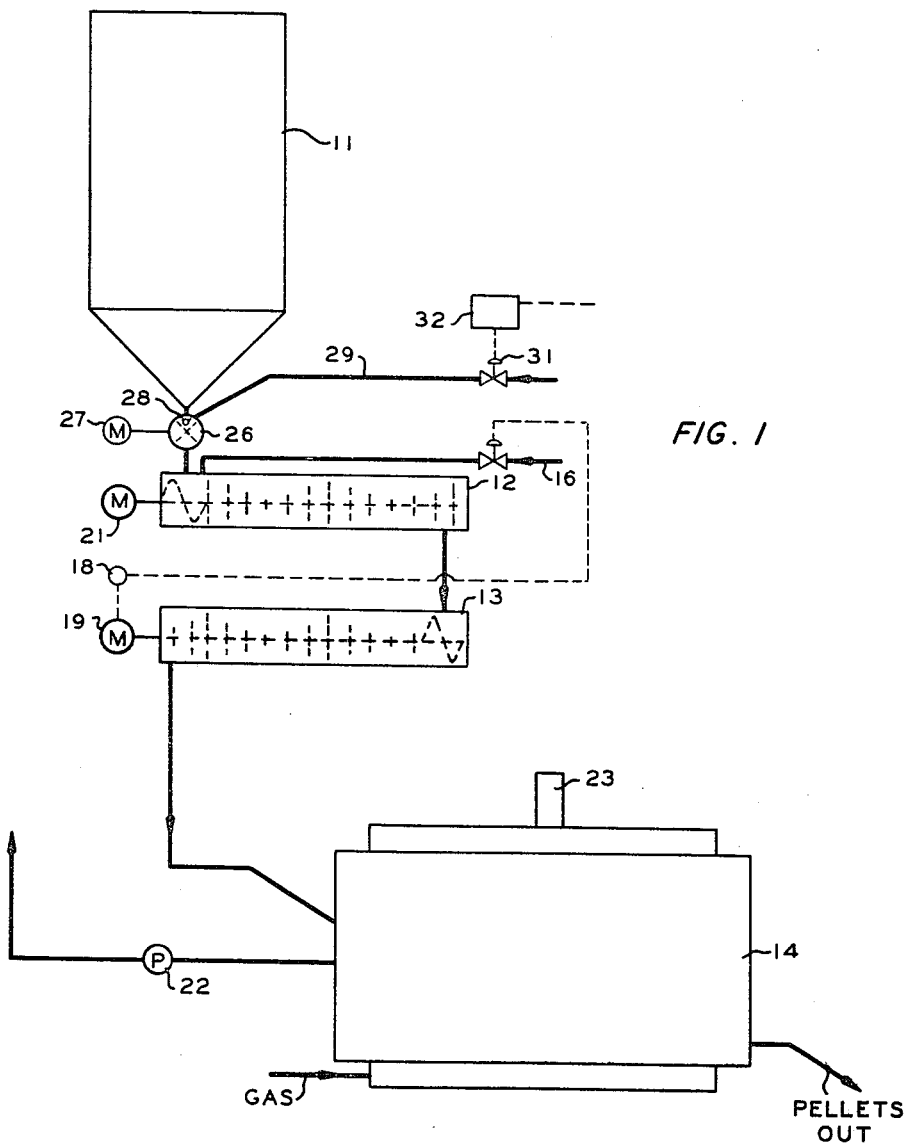

In FIGURE 1 a storage bin 11 is connected with a wet mixer 12 and then with a polisher 13 and a dryer 14. Loose carbon black from bin 11 is supplied with a water and molasses solution through conduit 16. The amount of the solution is controlled by a controller 18 in accordance with the current supplied to motor 19 driving the polisher 13. Wet mixer 12 is driven by a motor 21. The output from polisher 13 is fed into dryer 14 which is a rotary drying drum heated by gas. Both mixer 12 and polisher 13 comprise an axial shaft with rods or stirring fingers extending radially from the shaft in a spiral pattern longitudinally thereof. A short section of spiral conveyor is provided at the inlet end of each of these devices. The drum of dryer 14 is heated by the burning of gas in burners beneath the drum, the hot combustion gases passing out around the drum and, preferably, also into the drum through conduits not shown, to carry away the moisture liberated from the carbon pellets, and removed through pump 22. Other combustion gases are passed through stack 23.

The flow of loose carbon black from bin 11 to mixer 12 is controlled by a rotary feed apparatus or star valve 26. Star valve 26 is driven by motor 27, the speed of which is set to the desired feeding rate. This can be adjusted by hand or by automatic control from another process variable.

To prevent feed stoppage or substantial variation in feed rate, a gas inlet 28 is provided in the upper portion of star valve 26 and connected with a conduit 29 through valve 31 to a source of gas under pressure (not shown). The injection of gas is controlled by a timer 32 which comprises an electric motor which periodically makes and breaks a set of contacts actuating a solenoid valve to control the supply of instrument air to valve 31 to open this valve for the desired length of time at regularly spaced intervals. In this way loose carbon black is fed successfully with no substantial variation in feed rate and no feed stoppages.

Figure 2:
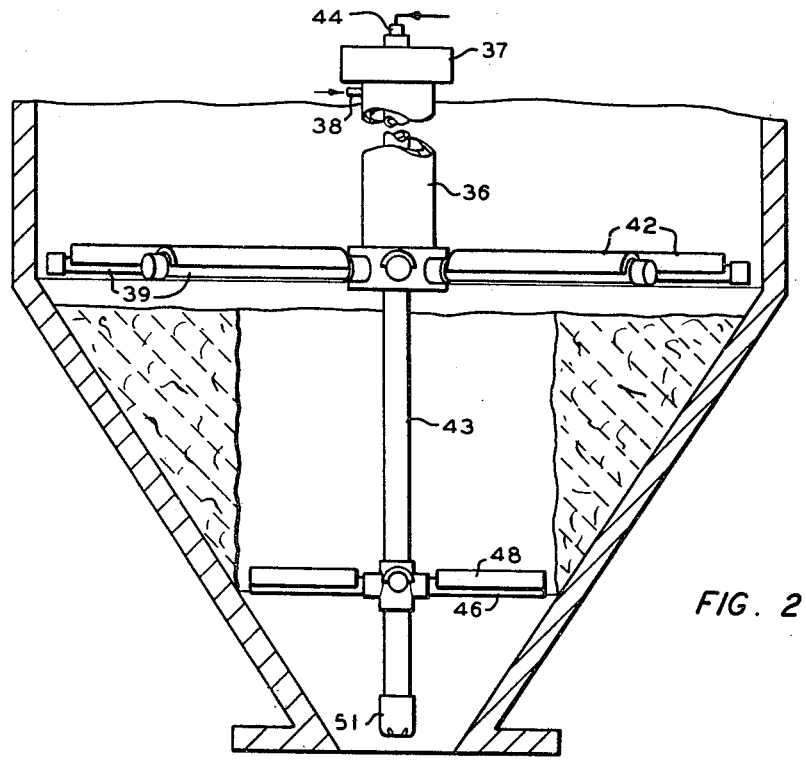

The apparatus of FIGURE 2 comprises apparatus which can be substituted for the lower portion, that is, the feed outlet of bin 11. In FIGURE 2, a first vertical conduit 36 is suspended within the bin by vibrator means 37. Vibrator means 37 can be supported on flexible supports such as pneumatic cushions, coil springs, etc. (not shown). Means are provided for supplying air to conduit 36 through a gas inlet 38. A plurality of horizontally-extending stirrer conduits 39 communicate with and are attached to and supported by conduit 36. The stirrer conduits 39 are also provided with outlet openings 41 and covers 42 both of which can be seen more clearly in FIGURE 5.

A second vertical conduit 43 also is supported by vibrator means 37 and extends upwardly therethrough where it is provided with a gas inlet 44. Conduit 43 communicates with and supports a second group of stirrer conduits 46 which also are provided with outlet openings 47 and covers 48, shown more clearly in FIGURE 5. Conduit 43 extends below conduits 46 and is provided with an injection outlet 51 which provides for fluidization of the loose particulate material immediately above a rotary flow controller (not shown in FIGURE 2). Covers 42 and 48 protect outlet openings 41 and 47, respectively. Control for the gas supplied to either or both of the gas inlets 38 and 44, to provide pulses at regularly-spaced intervals, can be provided. If desired, the conduits 36 and 43, and thus the attached two groups of horizontally-extending stirrer conduits, can be rotated along with, instead of being vibrated.

Figure 3:
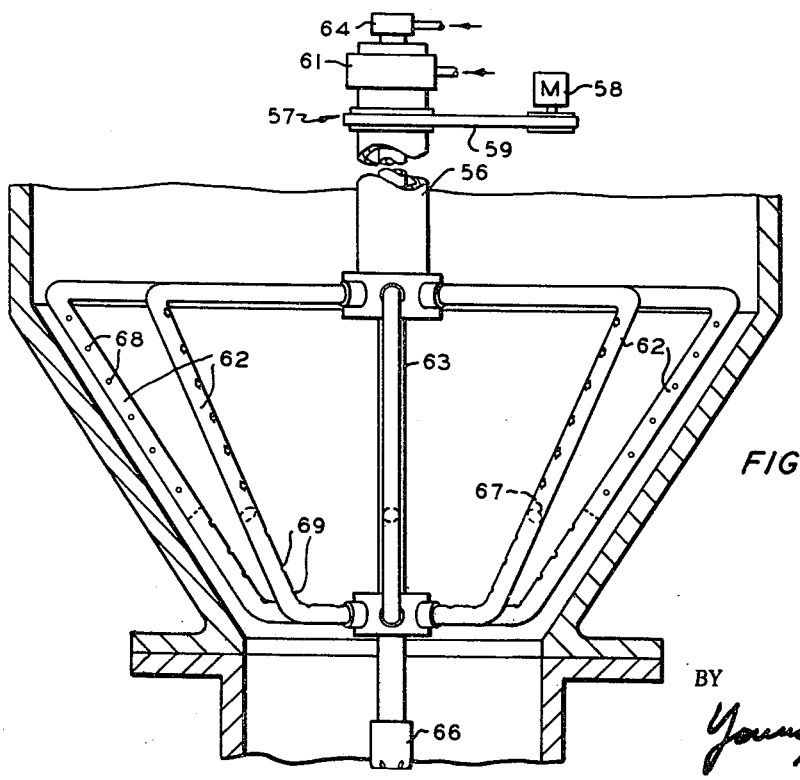

In the apparatus of FIGURE 3 a first vertical conduit 56 is suspended from rotator means 57 comprising a motor 58 and driving belt 59. It will be recognized that this rotator means is shown schematically and support means therefore are not illustrated. Any sort of support-bearing desired can be provided along with a suitable supporting framework. A gas inlet is provided for conduit 56 through a first rotary coupling 61. Conduit 56 is connected with the upper portion of a plurality of horizontally and vertically-extending stirrer conduits 62. Stirrer conduits 62 are also connected at the lower ends with a second vertical conduit 63. Conduit 63 is provided with a second rotary coupling 64 at its upper end for the inlet of fluidizing gas and extends downward to an injection outlet 66. Stirrer conduits 62 are provided with interior dividers 67 so that fluidizing gas can be supplied separately to the upper and lower portions thereby through conduits 56 and 63, respectively. Preferably the upper portions of conduits 62 are provided with outlets 68 in the direction of rotation thereof, thereby fluidizing the particulate material ahead of the stirrer conduits and facilitating rotation thereof. Preferably outlet openings 69 are provided on the upper surface of the lower portion of stirrer conduit 62 thereby providing for inlet of fluidizing gas in an upward direction.

Figure 4:
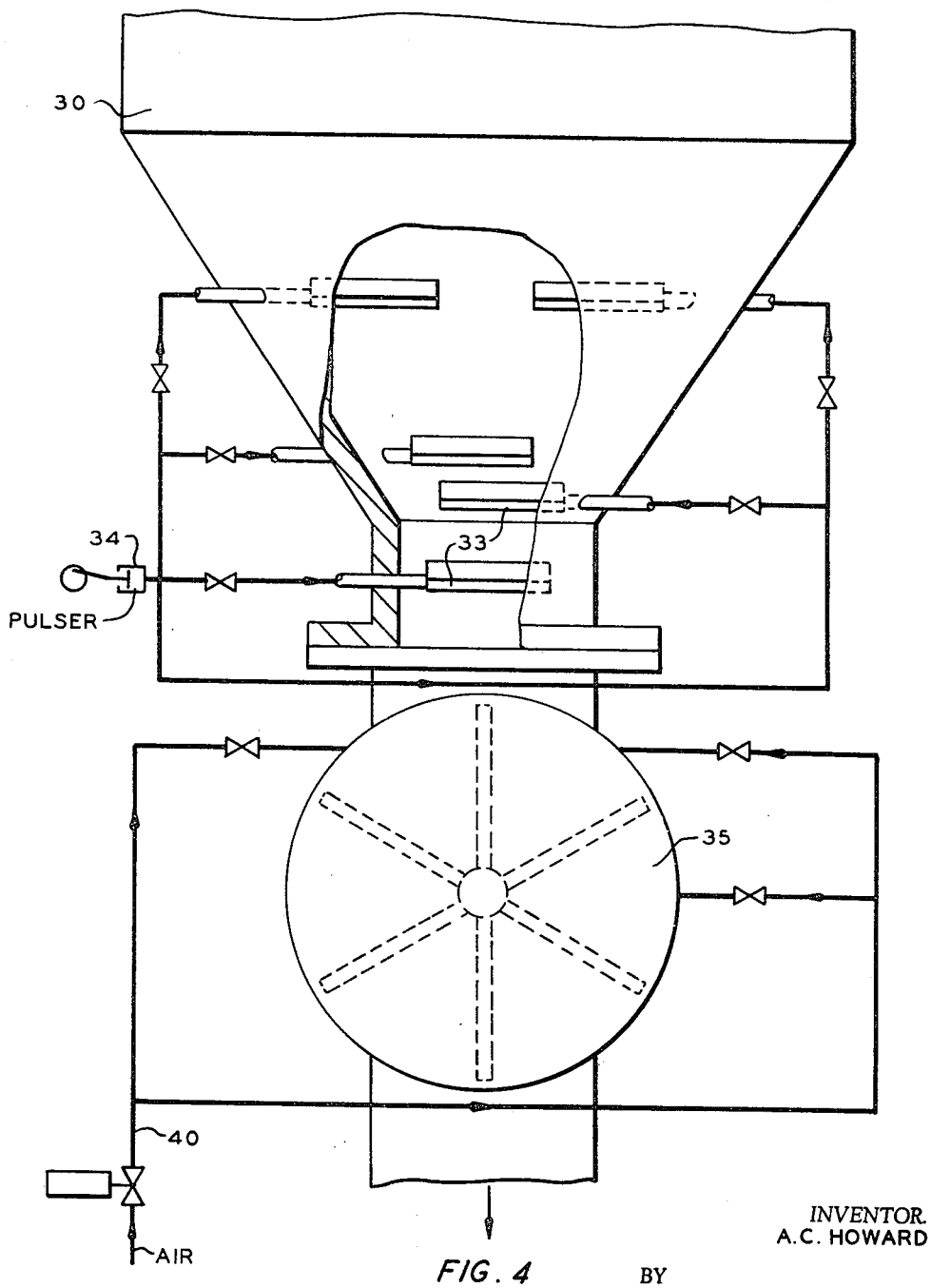
FIGURE 4 is a vertical elevation, in cross section, of a bin outlet showing a rotary flow control means and a plurality of injection conduits in the bin outlet.

In the apparatus of FIGURE 4 a bin 30 is provided with a plurality of injection conduits 33 which are supplied with air through pulsing means 34. Valves are provided as shown where it is desired to control the flow through the various injection conduits individually. Rotary flow control means 35 is provided on the outlet of the bin as shown. Air supply line 40 is provided to supply air to flow control means 35, and has means for interrupting the air supply so that the air comes into means 35 in pulses.

In FIGURE 6 a pelletizer 70 in the form of a pug mill about 10 feet long and 20-inch I.D. is provided with an axial shaft 72 on which are positioned 18-inch long rods or pins 74 arranged in a longitudinal spiral. Black feed line 76 enters the front end of the pelletizer along with water line 78 and effluent line 80 passes wet pellets to equipment (not shown) downstream for polishing and drying the pellets.

An electric motor 82 connects through suitable gear box 84 with the shaft 72 of the pelletizer for operating the rotor. Leads 85, 86 and 87 connect motor 82 with a suitable power source 88, usually an AC current source.

Positioned in water line 78 are a motor valve 90 and an indicating flow transmitter 92. A receiver-controller 94, also designated in the art as flow receiver-controller, controls the amount of opening of valve 90. A second receiver-controller 96 is operatively connected with receiver-controller 94 and with an electro-pneumatic transducer 98 through a pressure pulsation damper 100. Instrument 98 is connected in circuit with one phase of motor 82 through step-down transformer 102 and circuits 104 and 106. Instruments 90, 92, 94, 96 and 98 are pneumatic, being supplied with 20 pound air in conventional manner. Instrument 98 may contain an ammeter-recorder and a transducer which puts out a 3 to 15-pound air signal, the value depending upon the current passing through line 85. Instrument 98 may also be a thermal converter. This type of instrument is available through Leeds & Northrup Company, Philadelphia, Pa., Bulletin 77–39–0–2. This type of instrument is also disclosed in Considine, "Process Instruments and Controls Hand Book," Sec. 8, pages 57 and 64, McGraw-Hill Book Company, N.Y., 1957. The thermal converter measures power and takes into consideration the current, voltage, and power factor.

An arrangement of apparatus illustrated in the drawing was set up to operate on a 20-foot diameter, 10-foot long pelletizer of the pug mill type having 18-inch long rotor pins with chisel points, operated at a rotor speed of 330 r.p.m. by a Louis Allis gear motor 213A–Duty Class I, 1760 r.p.m., 10 H.P. 440 v., 3 phase, 60 cycle. Instrument 98 was a Taylor, Type 701TG131 electropneumatic transducer. This instrument was connected to one phase of the circuit of motor 82 through a Westinghouse Type OC–133 Current Transformer. Instrument 100 was a Taylor No. 588104 Pressure Pulsation Damping Unit. Instruments 94 and 96 were Taylor 95JF842 Receiver W/402RF1042 Controller. Instrument 92 was a Fischer & Porter No. 10A1152-1401KA41 Indicating Flow Transmitter.

In the arrangement described and shown, instrument 98 senses the current flow (which is substantially proportional to power) in line 85 or in one phase of 3-phase motor 82 and emits a pneumatic signal responsive thereto and substantially proportional to the current in amperes. This signal passes through damping unit 100 which smooths out severe fluctuations and passes the damped signal to primary or master controller 96 which, in cooperation with its set point, emits an air signal in the range of 3 to 15 p.s.i.g. to secondary or slave controller 94. Controller 94 receives a signal from indicating flow transmitter 92 in proportion to the flow of aqueous molasses solution flowing through line 78. Controller 94 then adjusts the position of valve 90 so as to proportion the flow rate of solution to the flow rate of black passing to the pelletizer so that a certain mixing power is expended to operate the rotor in pelletizer 70.

Actually, a cascade system control is involved wherein instrument 96 is the master or primary controller which controls instrument 94 as a secondary or slave controller. The signal emitted by instrument 96 is a demand signal for a specific rate of flow of water or aqueous solution in line 78. Controller 94 compares the signal from controller 96 with the signal from flow transmitter 92 (the actual flow in line 78) and, if the flow is below or above the demand signal from instrument 96, instrument 94 changes the setting of valve 90 to increase or decrease the flow rate until the signal from flow transmitter 92 corresponds with the signal from instrument 96.

The current (or power) as measured by the system comprising transformer 102, current transducer 98, and controller 96 in cooperation with the set point of controller 96 continues to adjust the signal emitted to controller 94 until the measured current is substantially equal to the set point current.

Star valve 119 (or other feeder) may be operated at a constant predetermined rate by motor 112 on shaft 114 which connects through variable speed transmission 116 with shaft 118 to drive the feeder. Speed transmitter 120 senses the speed of shaft 118 and emits a signal to controller 122 which controls transmission 116 at the speed of the set point of controller 122. The flow of carbon black can be controlled by adjusting the set point of controller 122.

A gas inlet 121 is provided in the upper portion of the star valve 119 and connected with a conduit 123 through valve 125 with a source of gas under pressure (not shown). Injection of gas is controlled by a timer 127 which comprises an electric motor which periodically makes and breaks a set of contacts actuating a solenoid valve to control the supply of instrument air to valve 125 to open this valve for the desired length of time at regularly spaced intervals, thus preventing substantial variation in carbon black feed rate and preventing flow stoppage.

In FIGURE 6, the flow rate of black through line 76 is maintained relatively constant and the water flow to pelletizer 70 is varied in response to changes in power required to operate the pelletizer under good pelleting conditions.

The flow of carbon black may be controlled by adjusting the set point of controller 122. In plant operation, star valve 119 has been operated to feed over the whole range from about 1200 to 3300 pounds of black/hour. The indicating flow transmitter 92 is capable of handling 0 to 4,000 pounds/hour of aqueous molasses solution (containing 0.5 to 3, preferably 1 to 1½ weight percent of molasses). The maximum range of current indication observed in several weeks operation has been from 8½ amps for 1500 pounds/hour solution rate to 10½ amps for 3300 pounds/hour solution rate. During this time there was usually a minute-by-minute fluctuation of ±½ amp to ±1 amp. This fluctuation was always reflected by comparable spread of pellet sizes, indicating pellet size as well as amps responds in less than a minute to ratio changes. In fact, the rate of response is 5–10 seconds from change in black rate to the resulting change in water rate. This response rate was determined by timing the air blasts into the star valve and comparing the water rate changes therewith. (Blast air serves to dislodge loose black in the bin and chute, but it was found that it stops the black flow during each blast and continues the flow when the blast stops.)

The arrangement of apparatus illustrated in FIGURE 7 maintains water flow to pelletizer 70 relatively constant and varies the flow rate of black through line 76 in response to changes in power required to operate the pelletizer under good pelleting conditions. The flow rate of water in line 78 is regulated by motor valve 90 which is controlled by controller 93, this controller being sensitive to a rate of flow signal from flow rate transmitter 92 in the water line.

The speed of feeder 110 is varied by controlling the speed of variable speed transmission 116. Controller 94 receives a signal from speed transmitter 120 proportional to the speed of shaft 118 and also a demand signal from controller 96 which varies with the carbon black feed requirements to maintain the predetermined constant power input to motor 84 as sensed by the system illustrated and described in relation to FIGURE 6.

Means other than the measurement of electrical power or current used to rotate the pelletizer can be used, including any means for measuring power or torque supplied in rotating the pelletizer. Means for injecting pulses of gas similar to those shown in FIGURE 6 are also illustrated in FIGURE 7 and used in the same manner.

EXAMPLE

In an example according to my invention, a 16-foot diameter round outlet 12 feet long feeds into a conical section 11 feet long with a lower diameter of 20 inches. An outlet from the bottom of the conical section feeds into a 12-inch diameter by 12-inch long star valve having 6 quadrants. A gas inlet is a ½-inch pipe connected with a source of air with a pressure which varies from 60 to 100 p.s.i.g. A scraper is provided in the lower portion of the conical section. When the star valve is rotated 15 r.p.m. and air is injected into the ½-inch pipe, which is connected above the center line, for 5 seconds out of every 30 seconds, the flow rate of carbon black is maintained at about 3000 pounds/hour with no detectable short-term flow variation. It is estimated that there is a long-term variation of no more than about ±150 pounds/hour.

In all embodiments of my invention the pressure necessary to fluidize a portion of carbon black in the bin can be utilized to measure the level of black in the bin. Existing methods for measuring these levels use mechanical devices or weighing devices which have a relatively high initial cost and create operating difficulties. The system utilizing gas pressure is a low cost system and simple and trouble free in operation. It comprises a pressure measuring point at the bottom of the bin and a differential pressure measurement, the high side of which is connected to this pressure point. The low side of the differential pressure instrument can be left open to the atmosphere if the bin is open to the atmosphere or can be connected to the top of the bin if the bin is not open to the atmosphere. A small flow of gas is provided through the pressure points to provide a purge to prevent clogging of these points.

In FIGURE 6 a pressure point 131 is provided near the bottom of bin 108. Purge air is supplied from instrument air line 132 through flow indicating means 134. The differential pressure measuring instrument 133 communicates with line 135 and with the upper portion of bin 108 if desired. Usually it is preferred to utilize a differential pressure transmitter for indicator 134 and to record the differential pressure on recorder 136. If desired the purge gas can be regulated automatically in which case a flow controller and control valve would be substituted for indicator 133. Purge air is supplied from instrument air line 132 through flow indicating means 137, when a pressure point at the top of bin 108 is utilized. Flow indicating means 137 can be replaced by a flow controller and control valve if desired.

The system of level measurements in accordance with the differential pressure relies upon the fact that, when gas is injected into the carbon black at one point in the bin, the pressure required to fluidize a portion of the black is a function of the depth of the bed. With pulsed air injection a small portion of the bed is periodically fluidized and the differential pressure is at this time a function of the bed level.

In a run utilizing the same equipment as that described in the above example, the level varied from a very low level to overflowing. The differential recorder indicated a pressure variation of 4 inches to 19 inches of water. Under these conditions the tank level indication was about 1 inch of water per foot of carbon black in the bin.

The absolute value of the variation in differential pressure with variation in level is a function of the weight-to-volume ratio of the partially fluidized material in the bed. Therefore, calibration is necessary to utilize the differential pressure measurement as a measure of absolute level, although even without calibration, it will accurately indicate level changes.

In the above run, a continuous air purge was provided through a rotometer to permit a constant flow of air to be maintained.

Reasonable variation and modification are possible within the scope of my invention which sets forth method and apparatus for feeding loose particulate material at an accurately controlled rate while preventing flow stoppages, by a periodic injection at regular intervals of short pulses of fluidizing gas.

I claim:
1. In a method for wet pelleting carbon black comprising the steps of:
   feeding said black from a source of supply through a flow control zone for said black to a pelletizer-mixer having a rotatable agitator therein rotating at a speed which forms wet pellets;
   feeding an aqueous liquid to said pelletizer-mixer at a flow rate suitable for forming good pellets therein;
   sensing the power required to rotate said pelletizer-mixer;
   regulating the black and liquid feed rates separately so as to maintain said power relatively constant by increasing the liquid concentration in the black in said pelletizer-mixer when said power falls below a selected value and decreasing said concentration when said power rises above said selected value; the improvement comprising
      periodically injecting pulses of a gas at regular intervals into the flow control zone from a source independent of the said supply zone to prevent feed stoppage or substantial variation in feed rate.
2. The process of claim 1 wherein said liquid feed rate is controlled in response to the sensed power while maintaining the flow of said black relatively constant.
3. The process of claim 1 wherein the flow of said carbon black through said control zone is controlled in response to the sensed power and said liquid feed rate is maintained relatively constant.

References Cited

UNITED STATES PATENTS

| | | | |
|---|---|---|---|
| 2,948,918 | 8/1960 | Austin | 23—314 |
| 3,024,093 | 3/1962 | Aye | 23—314 X |
| 3,071,803 | 1/1963 | Austin | 18—1 |
| 3,266,873 | 8/1966 | Alleman | 23—314 |
| 3,266,874 | 8/1966 | Alleman | 23—314 |
| 3,293,003 | 12/1966 | Jones | 23—314 |

WILBUR L. BASCOMB, Jr., Primary Examiner

S. J. EMERY, Assistant Examiner

U.S. Cl. X.R.

264—117